United States Patent
Morse et al.

(10) Patent No.: US 9,434,131 B2
(45) Date of Patent: Sep. 6, 2016

(54) BUILDING PANEL HAVING A FOAM BACKED FIBER CEMENT SUBSTRATE

(75) Inventors: Rick James Morse, Grass Lake, MI (US); Robert D. Shaw, Parma, MI (US); Gregory F. Jacobs, Oreland, PA (US)

(73) Assignee: PLYCEM USA, INC., Alpharetta, GA (US)

( * ) Notice: Subject to any disclaimer, the term of this patent is extended or adjusted under 35 U.S.C. 154(b) by 0 days.

(21) Appl. No.: 12/874,704

(22) Filed: Sep. 2, 2010

(65) Prior Publication Data

US 2010/0319288 A1  Dec. 23, 2010

Related U.S. Application Data

(62) Division of application No. 11/874,413, filed on Oct. 18, 2007, now abandoned, which is a division of application No. 10/955,405, filed on Sep. 30, 2004, now abandoned.

(51) Int. Cl.
*E04F 13/08* (2006.01)
*E04F 13/18* (2006.01)
(Continued)

(52) U.S. Cl.
CPC . *B32B 7/08* (2013.01); *B32B 5/18* (2013.01); *B32B 13/02* (2013.01); *B32B 13/045* (2013.01); *B32B 13/12* (2013.01); *E04D 1/28* (2013.01); *E04F 13/0864* (2013.01); *E04F 13/0866* (2013.01); *E04F 13/0869* (2013.01); *E04F 13/0871* (2013.01); *E04F 13/141* (2013.01); *E04F 13/185* (2013.01); *B32B 2250/02* (2013.01); *B32B 2262/04* (2013.01); *B32B 2266/025* (2013.01); *B32B 2266/0278* (2013.01); *B32B 2266/08* (2013.01); *B32B 2307/712* (2013.01); *B32B 2307/7265* (2013.01);
(Continued)

(58) Field of Classification Search
CPC ............ E04F 13/0864; E04F 13/0866; E04F 13/0869; E04F 13/0871; E04F 13/18; E04F 13/185; E04D 1/28; E04D 1/20; E04D 1/22; E04D 3/362; B32B 2419/04; B32B 2419/06
USPC ................ 52/518–560, 309.1–309.17, 302.4
See application file for complete search history.

(56) References Cited

U.S. PATENT DOCUMENTS 1,447,567 A  3/1923  Overbury
1,495,070 A  5/1924  Finley
(Continued)

FOREIGN PATENT DOCUMENTS

CA  721719  11/1965
CA  794590  9/1968
(Continued)

OTHER PUBLICATIONS

ACH Foam Technologies, "What is Expanded Polystyrene (EPS)?", May 30, 2011 https://web.archive.org/web/20110530114459/http://www.achfoam.com/What-is-EPS.aspx (Way Back Machine) http://www.achfoam.com/what-is-eps.aspx (Actual Link).*
(Continued)

*Primary Examiner* — Ryan Kwiecinski
(74) *Attorney, Agent, or Firm* — RatnerPrestia (57) ABSTRACT

A method comprises: providing a fiber cement substrate, and joining a porous, closed cell foam to a substantial portion of a major surface of the fiber cement substrate.

22 Claims, 9 Drawing Sheets

(51) Int. Cl.

| | | |
|---|---|---|
| *E04D 1/28* | (2006.01) | |
| *B32B 7/08* | (2006.01) | |
| *B32B 5/18* | (2006.01) | |
| *B32B 13/02* | (2006.01) | |
| *B32B 13/04* | (2006.01) | |
| *B32B 13/12* | (2006.01) | |
| *E04F 13/14* | (2006.01) | |

(52) U.S. Cl.
CPC ........ *B32B2419/04* (2013.01); *B32B 2419/06* (2013.01); *B32B 2607/00* (2013.01); *Y10T 428/249953* (2015.04); *Y10T 428/249976* (2015.04); *Y10T 428/249982* (2015.04)

(56) References Cited

U.S. PATENT DOCUMENTS

| | | | |
|---|---|---|---|
| 1,592,218 A | 7/1926 | Motzko | |
| 1,732,403 A | 10/1929 | Harris et al. | |
| 1,787,163 A | 12/1930 | New | |
| 1,872,185 A | 8/1932 | Reade | |
| 1,959,960 A | 5/1934 | Magrath | |
| 2,089,005 A | 8/1937 | Sherman et al. | |
| 2,142,181 A | 1/1939 | Croce | |
| 2,149,741 A | 3/1939 | Miles | |
| 2,171,010 A | 8/1939 | Schuetz et al. | |
| 2,174,098 A | 9/1939 | Stein | |
| 2,187,203 A | 1/1940 | Johnston | |
| 2,192,933 A | 3/1940 | Saborsky | |
| 2,193,233 A * | 3/1940 | Hardy ............... | 52/416 |
| 2,199,760 A | 5/1940 | Schuetz | |
| 2,206,042 A | 7/1940 | Novak | |
| 2,231,007 A * | 2/1941 | Vane ................. | E04F 13/0864 |
| | | | 52/539 |
| 2,238,017 A | 4/1941 | Duncan | |
| 2,264,961 A | 12/1941 | Ward | |
| 2,308,789 A | 1/1943 | Stagg | |
| 2,317,926 A | 4/1943 | Lindahl | |
| 2,560,521 A | 7/1951 | Camp et al. | |
| 2,633,441 A | 3/1953 | Buttress | |
| 2,779,065 A | 1/1957 | Rehme | |
| 2,782,464 A | 2/1957 | Joppich | |
| 2,840,867 A | 7/1958 | Wilder | |
| 2,954,302 A | 9/1960 | Gorman, Jr. | |
| 3,001,332 A | 9/1961 | Wilder | |
| 3,004,483 A | 10/1961 | Prager et al. | |
| 3,110,130 A | 11/1963 | Trachtenberg | |
| 3,111,787 A | 11/1963 | Chamberlain | |
| 3,158,960 A | 12/1964 | Newton et al. | |
| 3,159,943 A | 12/1964 | Sugar et al. | |
| 3,185,297 A | 5/1965 | Rutledge | |
| 3,284,980 A | 11/1966 | Dinkel | |
| 3,289,371 A | 12/1966 | Pearson et al. | |
| 3,304,678 A | 2/1967 | Morell | |
| 3,308,586 A | 3/1967 | Olson | |
| 3,391,037 A | 7/1968 | McNulty | |
| 3,607,486 A | 9/1971 | Jacks et al. | |
| 3,608,261 A | 9/1971 | French et al. | |
| 3,742,668 A | 7/1973 | Oliver | |
| 3,766,003 A | 10/1973 | Schuller et al. | |
| 3,811,240 A * | 5/1974 | Horny ............... | E04D 1/28 |
| | | | 52/521 |
| 3,830,687 A | 8/1974 | Re et al. | |
| 3,868,300 A | 2/1975 | Wheeler | |
| 3,868,801 A | 3/1975 | Weiner | |
| 3,887,410 A | 6/1975 | Lindner | |
| 3,919,443 A | 11/1975 | Porter | |
| 3,927,501 A | 12/1975 | Allen et al. | |
| 3,929,947 A | 12/1975 | Schwartz et al. | |
| 3,935,021 A | 1/1976 | Greve et al. | |
| 3,941,632 A | 3/1976 | Swedenberg et al. | |
| 3,944,698 A | 3/1976 | Dierks et al. | |
| 3,947,398 A | 3/1976 | Williams | |
| 3,993,822 A | 11/1976 | Knauf et al. | |
| 3,998,021 A | 12/1976 | Lewis | |
| 4,015,391 A | 4/1977 | Epstein et al. | |
| 4,020,237 A | 4/1977 | Von Hazmburg | |
| 4,033,802 A | 7/1977 | Culpepper, Jr. et al. | |
| 4,034,528 A | 7/1977 | Sanders et al. | |
| 4,040,851 A | 8/1977 | Ziegler | |
| 4,047,355 A | 9/1977 | Knorr | |
| 4,065,333 A | 12/1977 | Lawlis et al. | |
| 4,065,597 A | 12/1977 | Gillespie | |
| 4,073,997 A | 2/1978 | Richards et al. | |
| 4,081,939 A | 4/1978 | Culpepper et al. | |
| 4,096,011 A | 6/1978 | Sanders et al. | |
| 4,100,711 A | 7/1978 | Skuran | |
| 4,112,174 A | 9/1978 | Hannes et al. | |
| 4,128,699 A | 12/1978 | Kole et al. | |
| 4,135,029 A | 1/1979 | Pfeffer | |
| 4,148,781 A | 4/1979 | Narukawa et al. | |
| 4,181,767 A | 1/1980 | Steinau | |
| 4,187,130 A | 2/1980 | Kautz | |
| 4,191,722 A * | 3/1980 | Gould ............... | 264/45.5 |
| 4,195,110 A | 3/1980 | Dierks et al. | |
| 4,203,788 A | 5/1980 | Clear | |
| 4,242,406 A | 12/1980 | El Bouhnini et al. | |
| 4,251,578 A | 2/1981 | Kaufmann | |
| 4,263,365 A | 4/1981 | Burgess et al. | |
| 4,265,064 A | 5/1981 | Parezo | |
| 4,265,979 A | 5/1981 | Baehr et al. | |
| 4,277,526 A | 7/1981 | Jackson | |
| 4,288,959 A | 9/1981 | Murdock | |
| 4,296,169 A | 10/1981 | Shannon | |
| 4,303,722 A | 12/1981 | Pilgrim | |
| 4,324,082 A | 4/1982 | Rutkowski et al. | |
| 4,335,177 A | 6/1982 | Takeuchi | |
| 4,344,804 A | 8/1982 | Bijen et al. | |
| 4,344,910 A | 8/1982 | Bijen | |
| 4,351,867 A | 9/1982 | Mulvey et al. | |
| 4,361,616 A | 11/1982 | Bomers | |
| 4,363,666 A | 12/1982 | Johnson et al. | |
| 4,364,212 A | 12/1982 | Pearson et al. | |
| 4,366,197 A | 12/1982 | Hanlon et al. | |
| 4,378,405 A | 3/1983 | Pilgrim | |
| 4,399,643 A | 8/1983 | Hafner | |
| 4,403,006 A | 9/1983 | Bruce et al. | |
| 4,428,775 A | 1/1984 | Johnson et al. | |
| 4,437,274 A | 3/1984 | Slocum et al. | |
| 4,468,909 A | 9/1984 | Eaton | |
| 4,477,300 A | 10/1984 | Pilgrim | |
| 4,504,533 A | 3/1985 | Altenhofer et al. | |
| 4,506,060 A | 3/1985 | White, Sr. et al. | |
| 4,506,486 A | 3/1985 | Culpepper, Jr. et al. | |
| 4,543,159 A | 9/1985 | Johnson et al. | |
| 4,571,356 A | 2/1986 | White, Sr. et al. | |
| 4,586,304 A | 5/1986 | Flamand | |
| 4,637,860 A | 1/1987 | Harper et al. | |
| 4,647,496 A | 3/1987 | Lehnert et al. | |
| 4,651,494 A | 3/1987 | VanWaggoner | |
| 4,664,707 A | 5/1987 | Wilson et al. | |
| 4,677,800 A | 7/1987 | Roodvoets | |
| 4,681,802 A | 7/1987 | Gaa et al. | |
| 4,704,048 A | 11/1987 | Ahlgrimm | |
| 4,722,866 A | 2/1988 | Wilson et al. | |
| 4,774,794 A | 10/1988 | Grieb | |
| 4,788,808 A | 12/1988 | Slocum | |
| 4,810,569 A | 3/1989 | Lehnert et al. | |
| 4,810,576 A | 3/1989 | Gaa et al. | |
| 4,811,538 A | 3/1989 | Lehnert et al. | |
| 4,864,788 A * | 9/1989 | Tippmann ............ | B23D 1/26 |
| | | | 52/309.8 |
| 5,016,415 A | 5/1991 | Kellis | |
| 5,022,207 A | 6/1991 | Hartnett | |
| 5,027,572 A | 7/1991 | Purcell et al. | |
| 5,102,260 A * | 4/1992 | Horvath et al. ...... | 52/169.5 |
| 5,148,645 A | 9/1992 | Lehnert et al. | |
| 5,220,762 A | 6/1993 | Lehnert et al. | |
| 5,319,900 A | 6/1994 | Lehnert et al. | |
| 5,342,680 A | 8/1994 | Randall | |
| 5,371,989 A | 12/1994 | Lehnert et al. | |
| 5,397,631 A | 3/1995 | Green et al. | |
| 5,401,588 A | 3/1995 | Garvey et al. | |
| 5,433,048 A | 7/1995 | Strasser | |

(56) References Cited

U.S. PATENT DOCUMENTS

| | | | |
|---|---|---|---|
| 5,439,518 A | 8/1995 | Francis et al. | |
| 5,501,056 A | 3/1996 | Hannah et al. | |
| 5,502,940 A * | 4/1996 | Fifield | B28B 3/123 |
| | | | 52/309.11 |
| 5,564,243 A * | 10/1996 | Kroll et al. | 52/302.4 |
| 5,598,677 A | 2/1997 | Rehm, III | |
| 5,601,888 A | 2/1997 | Fowler | |
| 5,614,307 A | 3/1997 | Andersen et al. | |
| 5,636,489 A | 6/1997 | Leverrier et al. | |
| 5,644,880 A | 7/1997 | Lehnert et al. | |
| 5,704,179 A | 1/1998 | Lehnert et al. | |
| 5,718,785 A | 2/1998 | Randall | |
| 5,772,846 A | 6/1998 | Jaffee | |
| 5,791,109 A | 8/1998 | Lehnert et al. | |
| 5,799,446 A | 9/1998 | Tamlyn | |
| 5,830,548 A | 11/1998 | Andersen et al. | |
| 5,832,677 A | 11/1998 | Kurttila | |
| 5,881,502 A | 3/1999 | Tamlyn | |
| 5,897,108 A | 4/1999 | Gordon et al. | |
| 5,906,364 A | 5/1999 | Thompson et al. | |
| 5,945,182 A | 8/1999 | Fowler et al. | |
| 5,960,598 A | 10/1999 | Tamlyn | |
| 5,981,406 A | 11/1999 | Randall | |
| 5,993,303 A | 11/1999 | Fladgard et al. | |
| 6,018,924 A | 2/2000 | Tamlyn | |
| 6,029,415 A | 2/2000 | Culpepper et al. | |
| 6,029,966 A | 2/2000 | Hertz et al. | |
| 6,030,447 A | 2/2000 | Naji et al. | |
| 6,195,952 B1 | 3/2001 | Culpepper et al. | |
| 6,258,190 B1 | 7/2001 | Sciarrino et al. | |
| 6,263,574 B1 | 7/2001 | Lubker, II et al. | |
| 6,276,107 B1 | 8/2001 | Waggoner et al. | |
| 6,293,534 B1 | 9/2001 | Leban | |
| D448,865 S | 10/2001 | Manning | |
| D450,138 S | 11/2001 | Barber | |
| 6,321,500 B1 | 11/2001 | Manning et al. | |
| 6,341,458 B1 | 1/2002 | Burt | |
| 6,346,146 B1 | 2/2002 | Duselis et al. | |
| 6,354,049 B1 | 3/2002 | Bennett | |
| 6,358,585 B1 | 3/2002 | Wolff | |
| 6,367,222 B1 | 4/2002 | Timbrel et al. | |
| 6,418,610 B2 | 7/2002 | Lubker, II et al. | |
| 6,434,890 B1 | 8/2002 | Konnerth | |
| 6,506,248 B1 | 1/2003 | Duselis et al. | |
| 6,510,667 B1 | 1/2003 | Cottier et al. | |
| D471,292 S | 3/2003 | Barber | |
| 6,526,718 B2 | 3/2003 | Manning et al. | |
| 6,572,697 B2 | 6/2003 | Gleeson et al. | |
| 6,619,004 B2 | 9/2003 | Loper | |
| 6,625,950 B1 | 9/2003 | Shreiner et al. | |
| 6,676,745 B2 | 1/2004 | Merkley et al. | |
| 6,684,597 B1 | 2/2004 | Butcher | |
| 6,705,052 B1 | 3/2004 | Larson | |
| 6,863,972 B2 | 3/2005 | Burger et al. | |
| 6,886,301 B2 | 5/2005 | Schilger | |
| 7,040,067 B2 | 5/2006 | Mowery et al. | |
| D530,833 S | 10/2006 | Robertson et al. | |
| 7,188,454 B2 | 3/2007 | Mowery et al. | |
| 7,244,477 B2 * | 7/2007 | Sawyer et al. | 428/17 |
| 7,367,165 B2 | 5/2008 | Hatzinikolas | |
| 7,712,276 B2 * | 5/2010 | Gilbert et al. | 52/529 |
| 7,762,040 B2 * | 7/2010 | Wilson et al. | 52/518 |
| 7,934,352 B1 | 5/2011 | Mollinger et al. | |
| 2002/0029537 A1 | 3/2002 | Manning et al. | |
| 2002/0108333 A1 | 8/2002 | Clayton | |
| 2003/0029097 A1 | 2/2003 | Albracht | |
| 2003/0056458 A1 * | 3/2003 | Black | B28B 1/002 |
| | | | 52/541 |
| 2004/0200171 A1 | 10/2004 | Schilger | |
| 2004/0200183 A1 | 10/2004 | Schilger | |
| 2005/0072092 A1 * | 4/2005 | Williams | E04D 1/22 |
| | | | 52/518 |
| 2005/0081468 A1 | 4/2005 | Wilson et al. | |
| 2006/0042183 A1 | 3/2006 | Benes | |
| 2006/0053715 A1 * | 3/2006 | Mowery | E04F 13/0864 |
| | | | 52/309.8 |
| 2006/0053740 A1 * | 3/2006 | Wilson | E04F 13/0864 |
| | | | 52/745.09 |
| 2006/0068188 A1 * | 3/2006 | Morse | B32B 5/18 |
| | | | 428/304.4 |
| 2006/0272257 A1 | 12/2006 | Hobbie | |
| 2007/0044402 A1 | 3/2007 | Hess | |
| 2007/0212970 A1 * | 9/2007 | Rockwell | D04H 1/48 |
| | | | 442/394 |
| 2010/0011691 A1 * | 1/2010 | Anaya | E04D 1/265 |
| | | | 52/411 |
| 2010/0281801 A1 * | 11/2010 | Shaw | B32B 5/18 |
| | | | 52/302.1 |
| 2013/0247493 A1 * | 9/2013 | Culpepper | E04F 13/075 |
| | | | 52/309.4 |

FOREIGN PATENT DOCUMENTS

| | | |
|---|---|---|
| CA | 993779 | 7/1976 |
| DE | 1 033 133 B1 | 6/1955 |
| DE | 1 509 853 B1 | 4/1963 |
| DE | 1 223 287 B1 | 8/1965 |
| DE | 28 08 723 A1 | 3/1979 |
| EP | 0 148 760 A2 | 7/1985 |
| EP | 0 148 761 A2 | 7/1985 |
| EP | 0973699 B1 | 6/2003 |
| EP | 0943040 B1 | 12/2003 |
| GB | 772 581 A | 4/1957 |
| GB | 1 204 541 A | 9/1970 |
| GB | 1 520 241 A | 9/1978 |
| GB | 2 004 807 A | 4/1979 |
| GB | 2 103 563 A | 2/1983 |
| JP | 2141484 A2 | 5/1990 |
| JP | 3208871 A2 | 9/1991 |
| JP | 03337538 | 11/1991 |
| JP | 04189937 | 6/1992 |
| JP | 04189938 | 6/1992 |
| JP | 5147997 A2 | 6/1993 |
| JP | 6001679 A2 | 1/1994 |
| JP | 6008219 A2 | 1/1994 |
| JP | 7187748 A2 | 7/1995 |
| WO | WO 98/16697 A1 | 4/1998 |
| WO | WO 98/45222 A1 | 10/1998 |
| WO | WO9957392 A1 | 11/1999 |
| WO | WO 00/21901 A1 | 4/2000 |
| WO | WO 00/61519 A1 | 10/2000 |
| WO | WO 01/16048 A1 | 3/2001 |
| WO | WO 01/42164 A1 | 6/2001 |
| WO | WO 02/25034 A1 | 3/2002 |
| WO | WO 02/31287 A1 | 4/2002 |
| WO | WO 02/070247 A1 | 9/2002 |
| WO | WO 02/070248 A1 | 9/2002 |
| WO | WO 02/070425 A1 | 9/2002 |
| WO | WO 02/081399 A1 | 10/2002 |
| WO | WO 2004/018090 A1 | 3/2004 |

OTHER PUBLICATIONS

John Bartlo, energsmart, "Open vs. Closed Cell Foam", Jun. 21, 2011; https://web.archive.org/web/20110621024252/http://www.energsmart.com/spray-foam-insulation/open-vs-closed-cell-foam.html (Way Back Machine) http://www.energsmart.com/spray-foam-insulation/open-vs-closed-cell-foam.html (Actual Link).*

Active Minerals Company LLC, Acti-Gel™ 208 Features & Benefits, Jan. 15, 2002, Trade Literature.

American Classics, Maibec, Trade Literature.

Azek Trimboards, Vycom Corp. Trade Literature.

Bakula, et al., The Study of Autoclaved Cellulose Fiber-Reinforced Cement Composites, Cement and Concrete Research, vol. 25, No. 1, pp. 71-78, 1995.

Brock Porous Closed Cell Composites—Building Construction, 2 pp. at http://www.brockusa.com/buildingcon.htm, May 3, 2004.

Brock Porous Closed Cell Composites—Flooring, 1 pg. at http://www.brockusa.com/housewrap.htm, May 3, 2004.

Brock Porous Closed Cell Composites—Thermal, 1 pg. at http://www.brockusa.com/thermal.htm, May 3, 2004.

(56) References Cited

OTHER PUBLICATIONS

Cedar Valley Handy Panels, Cedar Valley Shingle Systems, 1998, Trade Literature.
Cedar Valley Shingle Siding Panels, Cedar Valley Shingle Systems, 1999, Trade Literature.
Cement Boards, NERAC, Inc., Jun. 20, 2002.
Cemtrim Premium Fiber-Cement Trim, Trade Literature.
CertainTeed, Underlayment and BackerBoard FiberCement, Nov. 2002.
CertainTeed WeatherBoards™ Fiber Cement Siding, trade literature, Nov. 2003, pp. 1-27.
DensGold™ Exterior Guard, G-P Gypsum trade literature, 2003, pp. 1-16.
Engineered Material Handbook™ vol. 1, Composites, ASM International 1987-1998, p. 158.
Fernandez et al., "Cement-Bonded Boards from Wastewater Treatment Sludge of a Recycled Paper Mill," Wood-Cement Composites in the Asia-Pacific Region, pp. 73-80, Proceedings of a Workshop held in Canberra, Australia, Dec. 10, 2000.
HardiTRIM HLD™ Technology Exterior Trim, James Harding Siding Products, 1999, Trade Literature.
James Hardie Siding Products, Fact Sheet James Hardie Building Products U.S. Siding Operations and Products, Apr. 25, 2002, Trade Literature.
Marikunte, et al., Statistical Evaluation of Long-Term Durability Characteristics of Cellulose Fiber Reinforced Cement Composites, ACI Materials Journal/Nov.-Dec. 1994.
MIRATEC™ Treated Exterior Composite TRIM, Trade Literature.
Multishake, MaxiTile, Apr. 25, 2002, Trade Literature.
Owens Corning Exterior System, Sep. 10, 2000, Trade Literature.
Rhoplex® E-330 Cement Mortar Modifier, Rohm and Haas Company, 1997, Trade Literature.
Royal Wood® Precision Composites, Inc. Trade Literature.
Snapper Siding is Really Great Shakes, Pacific International Siding Co., Trade Literature.
Fancy Cuts Panel, Technical Bulletin 2004, Shakertown 1992, Inc., Trade Literature.
TruWood® Manufactured by Collins Products LLC Siding, Trade Literature.
Weather Boards, Fibercement Siding, CertainTeed, Nov. 2001, Trade Literature.
What's New, James Harding Building Products Buys Cemplank Plants, Cemplank, Apr. 25, 2002, Trade Literature.
Wierman et al., The Effects of Pressure on the Freeze-Thaw Durability of Fiber-Reinforced Cement Board, Inorganic-Bonded Wood Fiber and Composite Materials, Sep. 2002, 17 pp., vol. 8, Sun Valley Idaho, USA, pp. 1-14.
BASF Corporation, Polymin® PR 971 L, trade literature, 2 pages, 1998-2003 http://www.basf.com/SearchProxy/search?q=cache:bnHftBjgwvkJ:www.basf.com/business.
BASF Corporation, Retention and Dewatering Aids, Flocculants, and Fixing Agents, trade literature, 2 pages, 1998-2003 http://www.basf.com/SearchProxy/search?q=cache:8b9Jx0pnefEJ:www.basf.com/business.
DeGussa, Praestol® Flocculants for effective separation of solids from liquids, trade literature, 1 page, Mar. 7, 2005, http://www.degussa-Water.com/notesdata/bw/water.nsf/ hauptpunkte_en/2D4179FD9D2C3C.
DeGussa, Bleaching & Water Chemicals, Praestol® Flocculants for all Applications involving Solid/Liquid Separation (Clarification, Thickening, Dewatering), trade literature, pp. 1-17, undated.
Build-Smarter.com, Chapter Five: Roofing Materials, Fiber Cement Tiled, MaxiTile, trade literature, 2 pages, 1999 http://64.233.161.104/search?q=cache:4cbr8wfF3skJ:www.build-smarter.com/Chapter5/fibe.
Office Action dated Apr. 14, 2009 in U.S. Appl. No. 11/875,413.
Office Action dated Aug. 17, 2009 in U.S. Appl. No. 11/875,413.
Office Action dated Mar. 3, 2010 in U.S. Appl. No. 11/875,413.
Office Action dated Jun. 24, 2010 in U.S. Appl. No. 11/875,413.
Office Action dated Apr. 21, 2006 in U.S. Appl. No. 10/955,405.
Office Action dated Jun. 13, 2006 in U.S. Appl. No. 10/955,405.
Office Action dated Dec. 18, 2006 in U.S. Appl. No. 10/955,405.
Office Action dated Apr. 13, 2007 in U.S. Appl. No. 10/955,405.
Office Action dated Jun. 18, 2006 in U.S. Appl. No. 10/955,405.
Office Action dated Oct. 23, 2006 in U.S. Appl. No. 10/955,405.
Office Action dated Jul. 12, 2010 in U.S. Appl. No. 12/729,743.
Office Action dated Aug. 9, 2010 in U.S. Appl. No. 12/729,743.
Office Action dated Feb. 8, 2008 in U.S. Appl. No. 11/093,465.
Office Action dated May 27, 2008 in U.S. Appl. No. 11/093,465.
Office Action dated Dec. 23, 2008 in U.S. Appl. No. 11/093,465.
Office Action dated Jun. 23, 2009 in U.S. Appl. No. 11/093,465.
Office Action dated Dec. 17, 2009 in U.S. Appl. No. 11/093,465.
Office Action dated Mar. 26, 2010 in U.S. Appl. No. 11/093,465.

* cited by examiner

BUILDING PANEL HAVING A FOAM BACKED FIBER CEMENT SUBSTRATE

This application is a division of U.S. patent application Ser. No. 11/874,413, filed Oct. 18, 2007, which is a division of U.S. patent application Ser. No. 10/955,405, filed Sep. 30, 2004, both of which are expressly incorporated by reference herein in their entireties.

FIELD OF THE INVENTION

The present invention relates to building materials generally, and more specifically to fiber cement exterior building materials.

BACKGROUND

For more than 100 years, asbestos fiber cement materials were prevalent in such building products as roofing. In the 1980's, as the dangers of asbestos became known, replacement building materials were sought.

One proposed replacement for asbestos has been unbleached cellulose fibers, with about 35% cement, and about 55% fine ground silica, such as described in U.S. Pat. No. 6,030,447, the entirety of which is hereby incorporated by reference. This product is autoclave (steam heat and pressure) cured. It is generally made on a Hatschek machine. Cellulose fiber cement building products have surged in popularity in recent years. A variety of products are available in fiber-cement, including siding, shakes, and panels. Fiber cement products are strong and durable. Advantages of fiber cement products include consistent quality and excellent dimensional stability, class 1 (A) fire rating, imperviousness to wood-boring insects, resistance to damaging effects of salt spray and UV rays, and rot resistance.

However, cellulose fiber cement materials do not perform as well as asbestos fiber cement materials in that the cellulose fiber cement materials have lower resistance to water induced damage, higher water permeability, higher water migration ability (also known as wicking) and lower freeze thaw resistance when compared to asbestos cement composite materials. These drawbacks are largely due to the presence of water conducting channels and voids in the cellulose fibers. The pore spaces in the cellulose fibers can become filled with water when the material is submerged or exposed to rain/condensation for an extended period of time.

U.S. Patent Application Publication No. 2003/0056458 is incorporated by reference herein in its entirety. This publication describes a fiber cement panel in the form of horizontal planks or laps that have a strong "shadow line" or perceived thickness such that individual planks can be discerned from a distance without further increases in thickness of the fiber cement, to maintain a low material cost, weight and to maintain handling characteristics of long siding planks. The fiber cement plank assembly is comprised of a fiber cement siding plank, a region for fastening the siding plank to a mounting surface, and a locking overlap region on an inner surface of the siding plank near the lower end of the plank. The locking overlap region allows the fiber cement siding plank to be stacked with other siding planks in a manner such that the region for fastening of an adjacent plank is covered by the locking overlap region, and wherein the locking overlap region sets the gauge of the exposed plank face and allows for leveling of the plank during installation. The lock may include compressible regions, which allow the planks to be easily interlocked during installation and provides lateral compensation for non-planar mounting surfaces. The compressible material can also act as a seal against wind and rain. Thus, the compressible material helps prevent infiltration of water into the fiber cement plank.

An improved fiber cement product and methods of making the same are desired.

SUMMARY OF THE INVENTION

In some embodiments, a product comprises a fiber cement substrate, and a porous, closed cell foam joined to a substantial portion of a major surface of the fiber cement substrate.

In some embodiments, a product comprises a fiber cement substrate and a closed cell foam joined to a substantial portion of a major surface of the fiber cement substrate, at least one major surface of the foam having a plurality of grooves therein.

In some embodiments, a method comprises: providing a fiber cement substrate, and joining a porous, closed cell foam to a substantial portion of a major surface of the fiber cement substrate.

In some embodiments, a method comprises: providing a unitary panel, section of siding, soffit, shingle or shake including a fiber cement substrate and a porous, closed cell foam joined to a substantial portion of a major surface of the fiber cement substrate. The panel, section of siding, soffit or shake is mounted on a building surface.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both removable or rigid attachments or relationships, unless expressly described otherwise.

Figure 1A:
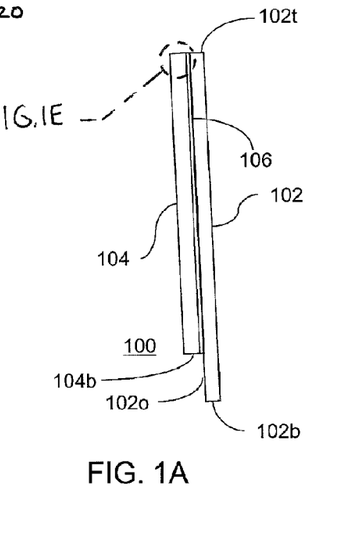
FIG. 1A is a left side elevation view of an exemplary embodiment of a section of foam backed fiber cement siding.

FIG. 1A is a side elevation view of a first example according to one embodiment of the invention. A product 100 comprises a fiber cement substrate 102 and a porous, closed cell foam 104 bonded to a substantial portion of a major surface of the fiber cement substrate. The substrate may be shaped as a section of siding, a shake, a shingle, a soffit, a roofing tile or shingle, or a panel. In this example, the substrate 102 is a section of lap siding intended for installation in an overlapping configuration with a bottom portion 102b of a first (upper) section of siding overlying a top portion 102t of an adjacent second (lower) section of siding.

The substrate may be made of any fiber—cement composition. For example, the material may be, but is not limited to, any of the cellulose fiber—cement compositions described in any of U.S. Pat. Nos. 6,030,447, 6,572,697, 6,676,745, 6,676,745, all of which are incorporated by reference herein in their entireties, as though fully set forth below.

The foam 104 (shown in FIG. 1A) covers a rear surface of the siding 102, except in an overlap region 102o of preferred embodiment 102, where the section of siding or shake is to overlap the top 102t of the adjacent section of siding or shake immediately below the section of siding or shake. Thus, the foam 104 covers a rear major surface of the section of siding or shake 102, except in a relatively narrow region 102o adjacent to a longest edge 102b of the substrate. Relatively narrow indicates that the width of the region 102 is small relative to the width (distance between the two longest edges of the substrate). For example, in some embodiments, a section of lap siding may have a length of about 12 feet and a width from about 5.25 inches to 8.25 inches, with the uncovered region 102o being about 1.25 inch wide. This configuration simulates a board in appearance, and may include an ornamental grain pattern. Other lengths and widths may be used. The foam 104 may be joined to the substrate 102 with or without an adhesive 106, as described further below.

The foam may be any of a variety of (porous or non-porous) closed cell foams. A closed cell foam will not soak up and hold water the way a sponge does. A preferred foam material 104 for example, can be a porous, closed-cell composite, formed by fusing together resilient, closed cell polymer beads 120 (as shown in FIG. 1E) only at their tangent points, providing a durable, non-absorptive composite that allows water to flow freely through the interstices 122 throughout the material and to drain from the foam. The foam may be made of a thermosetting resin, such as polyurethane, or a thermoplastic resin, such as an olefin, like polypropylene or polyethylene, for example. Examples of suitable foams are "BREATHE-N-DRAIN™", FPP2.1, FPP3.0, and FPP5.5 porous, closed cell polypropylene composites made by Brock USA of Boulder, Colo., or FPE2.7, FXPE2.1 and FXPE3.2 porous closed cell polyethylene composites, also made by Brock USA. Alternatively, polystyrene and polyurethane foams could be used.

Figure 1B:
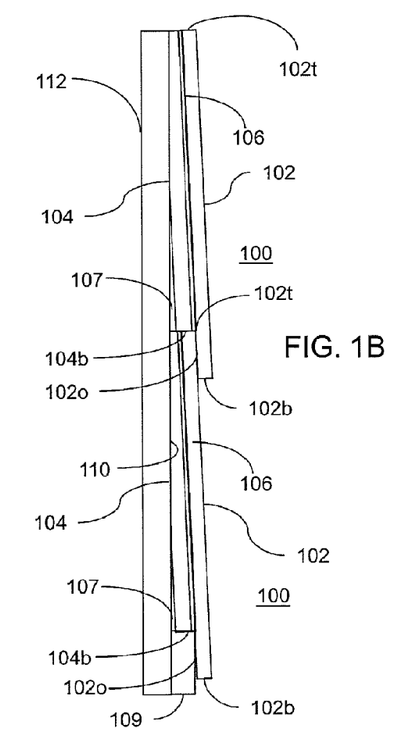
FIG. 1B is a left side elevation view showing two sections of siding as shown in FIG. 1A, installed on an exterior surface of a building.

As shown in FIGS. 1A and 1B, the siding 100 further comprises an adhesive 106 for bonding the foam to the substrate. Suitable adhesives include, but are not limited to, UV curable adhesives and hot melt adhesives, such as polyamines and urethanes, glue, thermosetting or thermoplastic adhesives, pressure sensitive adhesives or solvent-based adhesives. Other suitable adhesives include, but are not limited to Super77 multiple adhesive and high-strength 90 spray adhesive by Minnesota Mining and Manufacturing Co. (3M), St. Paul, Minn. Similarly, any of the other embodiments shown in FIGS. 1A-1D, 2A-2B, 3A-3B or 4A-4B may also use an adhesive to bond the foam 104, 204, 304 or 404 to the substrate 102, 202, 302 or 404, respectively.

The foam 104 provides a number of advantages when bonded to the fiber cement substrate 102. Use of a porous, closed cell foam 104 provides a drainage path for any water or moisture that infiltrates behind the siding 102. Because drainage is improved, the likelihood of water induced damage to the fiber cement substrate 102 is reduced. In some instances, the improved drainage can provide a diminished probability of occurrence of mold formation behind a siding element. The foam 104 provides additional advantages of a sound absorbing barrier, added thermal insulation, easier installation by providing a support and spacer (as discussed below with reference to FIGS. 1C to 1D), and protection during shipping. Depending on the type of foam used, and the desired thermal resistance, the foam 104 may in some cases eliminate the need for insulation that might otherwise be interposed between the house wrap and the siding. Further, for configurations where separate insulation is eliminated due to the use of foam backed siding 100, the exemplary siding reduces labor and installation costs.

In the example of FIGS. 1A-1D, the substrate 102 is flat, and the foam 104 is flat before installation (as shown in FIG. 1A). FIG. 1B shows how two of the overlapping sections 100 of siding or shakes fit together. It will be understood by one of ordinary skill that the sections 100 are installed on a building exterior sequentially on the exterior sheathing or surface 110 of a building. Although only two courses of siding are shown in FIG. 1B, any number of sections 100 of siding may be installed on the building, as appropriate to cover a complete wall.

The initial course 100 of siding may be positioned and aligned by first fastening a starter strip (e.g., a wood strip or other suitable material) 109 at the bottom of the exterior surface 110 of the exterior wall. The starter strip levels the siding, and also positions the siding at an angle with the bottom 102*b* spaced from the building surface 110, to provide the appearance of clapboard. An example of one alternative suitable material may be a metal strip (not shown) that may combine the functions of starter strip, spacer, flashing, and as a termite shield. Each subsequent siding course 100 is supported and aligned by the section immediately below it, as explained below.

Figure 1C:
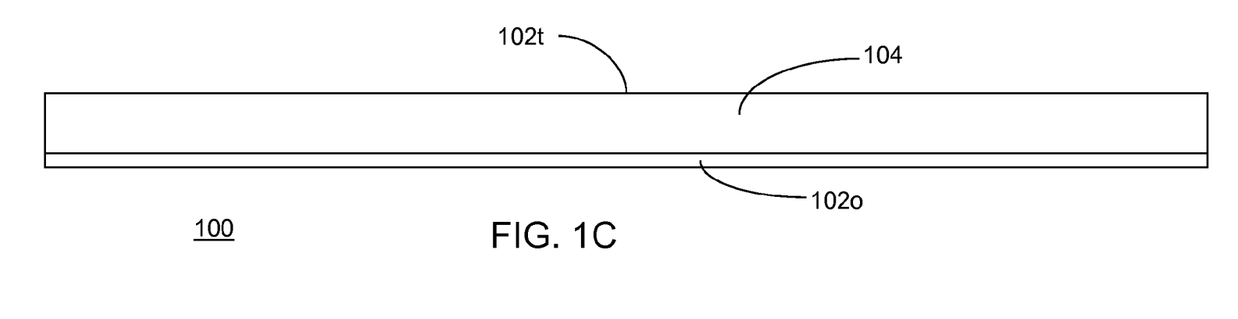
FIG. 1C is a rear elevation view of the section of siding shown in FIG. 1A.
Figure 1D:
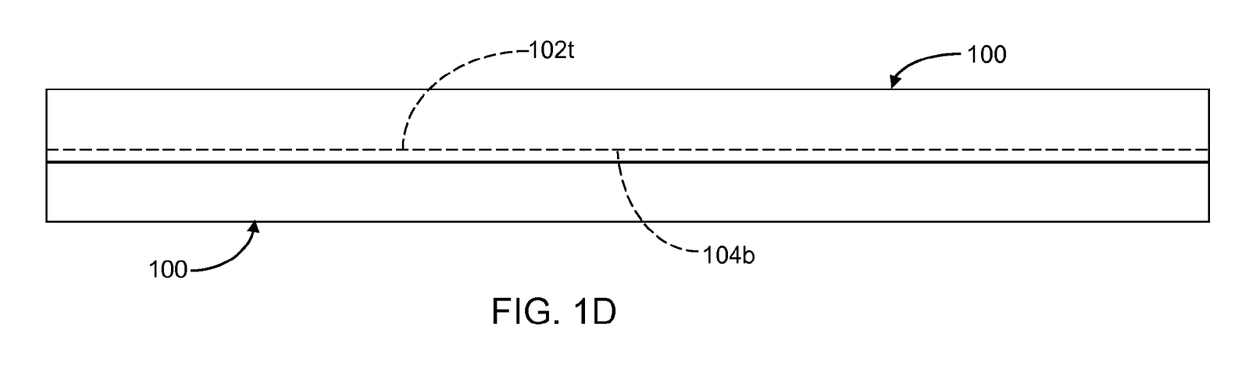
FIG. 1D is a front elevation view of the sections of siding shown in FIG. 1B.
Figure 1E:
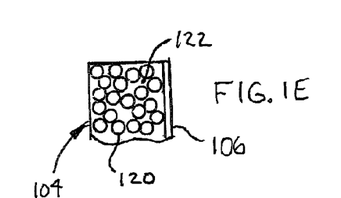
FIG. 1E is an enlarged detail of FIG. 1A.

Each section or shake in the siding course 100 has a top edge 102*t* that supports the bottom edge 104*b* of foam 104 of the adjacent section of siding immediately above it. FIG. 1C is a rear elevation view showing the foam 104 extending along the entire length of the section of siding. FIG. 1D is a front elevation view showing how the top edge 102*t* of the lower section of siding 100 supports the bottom edge 104*b* of the foam 104 in the adjacent section of siding immediately above. Thus, the foam 104 provides a means to support the upper section of siding 104 along a portion of, or its entire length, during and after installation. This simplifies installation, because the upper section of siding 100 is easily aligned parallel to the lower section of siding along its entire length, without the use of any external tooling, spacers or fixtures. With this configuration, sections of siding can readily be installed by a single person, instead of requiring two people, as was typical with prior art fiber cement siding planks.

As best seen in FIG. 1B, the foam 104 substantially fills the space between the substrate 102 and the exterior surface 110 of the building. Depending on the thickness of the foam and the distance between the exterior surface and the bottom edge 102*b* of the siding substrate, there may be a small air space 107. In the example of FIG. 1B, the top 102*t* of the substrate is very close to the exterior surface 110 (e.g., between about 0.06 inch and 0.12 inch), while the bottom edge of the substrate is spaced from the surface 110 (e.g., by about 0.25 inch), so that the foam 104 is optionally compressed near the top of the siding 100. (Incompressible foam may be used, for example, as shown in FIGS. 3B and 4B. The incompressible foam would be pre-shaped to orient the adjacent overlying substrate at the desired angle.) By sizing the foam thickness according to the distance from the bottom edge of the substrate 100 to the exterior surface 110 of the building, the space is substantially filled. Although the foam 104 is illustrated as having a substantially uniform cross sectional thickness, it may not always be uniform, For example, the foam can have one or more cavities, thicker and thinner cross-sections, or the like.

Figure 2A:
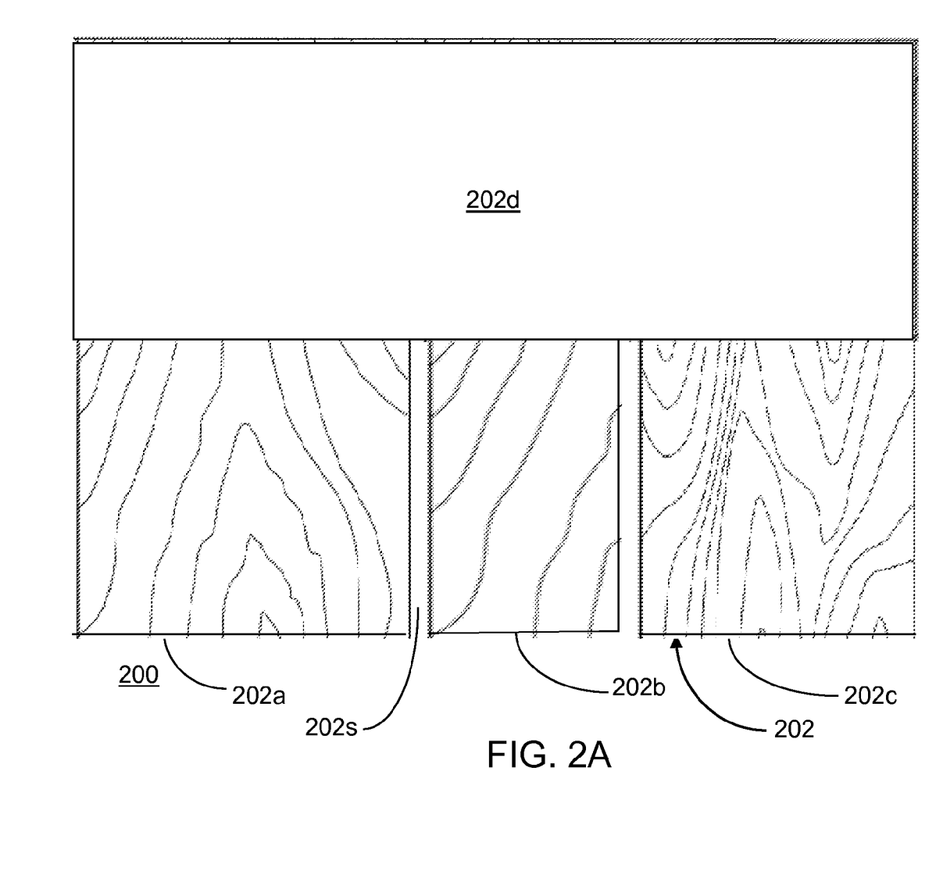
FIG. 2A is a front elevation view of an exemplary shake panel.
Figure 2B:
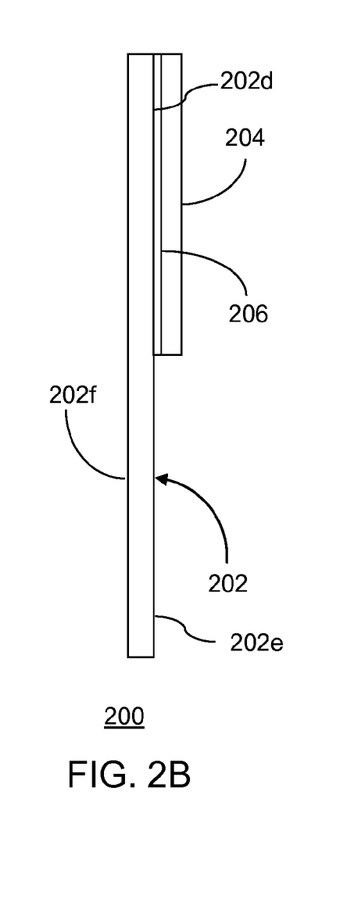
FIG. 2B is a right side elevation view of the shake panel of FIG. 2A.

FIGS. 2A and 2B show another example of a foam-backed fiber cement substrate 200 in the form of an exterior shake panel 200 having a plurality of distinct substrate portions 202*a*-202*c* that are separated from each other by a slot 202*s* therebetween, but are all joined to a common section 202*d*. Preferably, to simulate distinct shakes, the patterns are discontinuous at the slots 202*s* between a side edge of one "shake portion" (e.g., 202*a*) and an adjacent side edge of the adjacent "shake portion" (e.g., 202*b*). In this example, adjacent shake panels 200 overlap each other, but the overlap occupies a greater fraction of the entire area of the shake panel 200 than the overlap shown in FIG. 1B. Thus, as shown in FIG. 2B, the foam 204 covers one major surface of the common section 202*d*, while the overlap regions 202*a*-202*c* are not covered with foam 204. The foam is bonded using an adhesive 206, which may be the same as adhesive 106 described above. In other embodiments (not shown), the foam extends partially down the length of substrate portions 202*a*-202*c*. Although FIG. 2B shows an adhesive 206, in alternative embodiments, the foam 204 is bonded without adhesive.

Figure 2C:
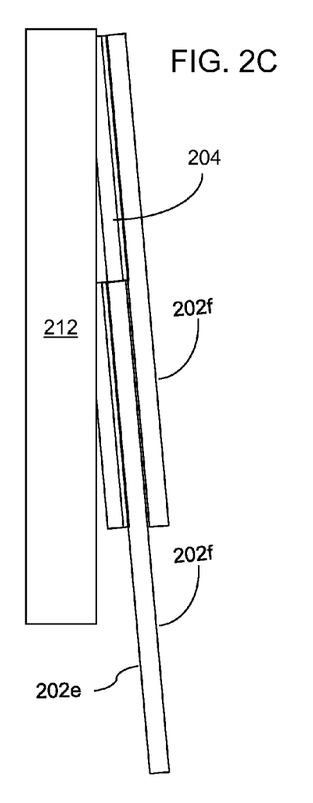
FIG. 2C is a left side elevation view showing two of the shake panels of FIG. 2A, mounted to a building member with the foam facing towards the building member.

In one embodiment, shown in FIG. 2C, a pattern is on one side 202*f* ("the front") of the substrate 200, and the foam 204 and adhesive 206 are on the opposite side 202*e* ("the rear) of the substrate. Then, the panels 200 are mounted with the foam facing the building members 212.

Figure 2D:
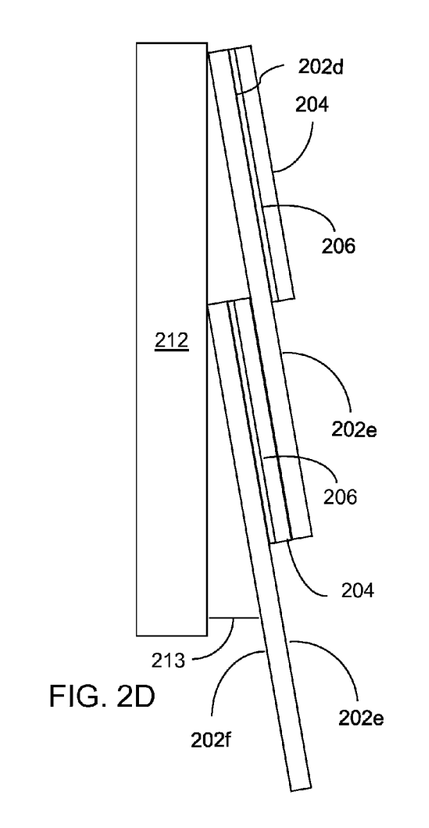
FIG. 2D is a left side elevation view showing two of the shake panels of FIG. 2A, mounted to a building member with the foam facing away from the building member.

In another embodiment shown in FIG. 2D, a pattern is on one side 202*e* ("the front") of the substrate 200, and the foam 204 and adhesive 206 are on the same side 202*e* ("the front) of the substrate. (A separate starter piece of foam 213 may be placed behind the bottom portion of the bottom panel 200 to orient the substrate 202 at the appropriate angle. A final set of shake sections 202*a*-202*c*—not shown—without the common section 202*d* may be mounted over the front facing foam 204 of the top panel 200).

In this embodiment, foam 204 from an adjacent lower panel would be visible behind the slots 202*s* of a given panel, and would be exposed to sunlight and precipitation. The foam 204 could be colored (e.g., the color of the patterned side of the substrate, or black) to provide a desired appearance. The foam could also be stabilized with antioxidants and light stabilizers, and a weather resistant coating to protect the foam from the sun, wind and rain. For example, the foam may include from about 0.1% to about 0.25% of UV absorber of the benzotriazole or benezophenone type.

In still another embodiment, the panel 200 may have two different patterns and/or colors. A first pattern and/or color may be provided on side 202*e* and a second pattern and/or color may be provided on side 202*f*. If the pattern on side 2*f* is desired, the installer installs the panel 200 with side 202*f* facing outwards, and the foam 204 to the rear (facing the building members 212), as shown in FIG. 2C. If the pattern on side 2*e* is desired, the installer installs the panel 200 with side 202*e* facing outwards, and the foam 204 to the front (facing away from the building members 212), as shown in FIG. 2D. With two different patterns and/or colors on opposite sides of the same panel 200, manufacturers, distributors and contractors are provided greater flexibility in inventory management.

Figure 3A:
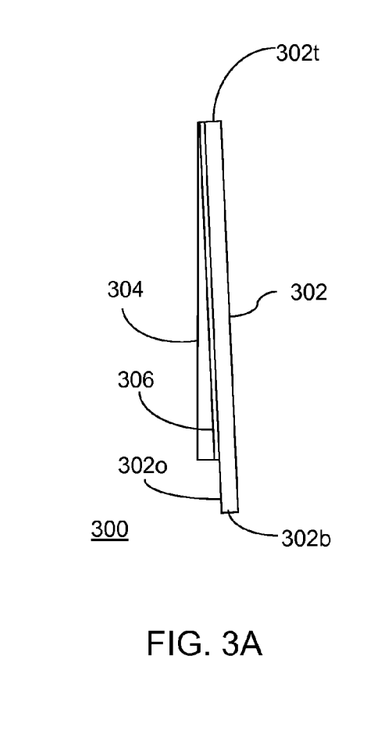
FIG. 3A is a left side elevation view of a variation of the section of foam backed fiber cement siding shown in FIG. 1A.
Figure 3B:
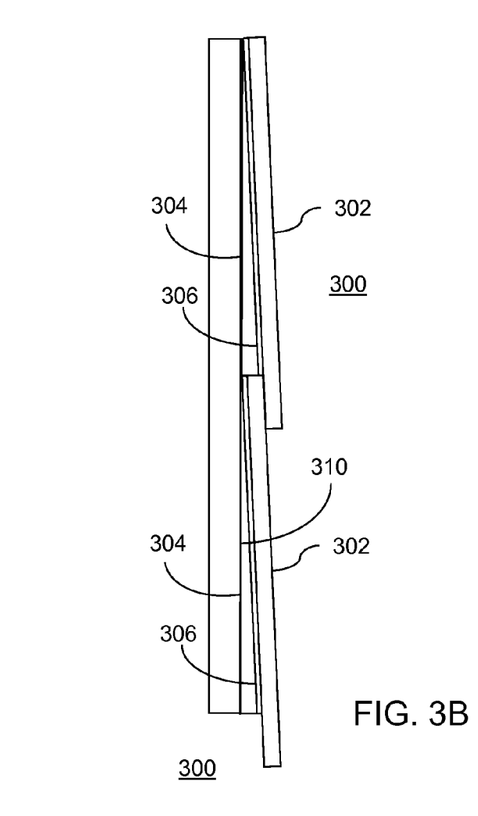
FIG. 3B is a left side elevation view showing two sections of siding as shown in FIG. 3A, installed on an exterior surface of a building.

FIGS. 3A and 3B show another embodiment of a section of siding, shakes, soffit or panel 300 having a fiber cement substrate 302 and foam 304, in which the foam 304 is tapered prior to installation. The foam 304 is tapered from a relatively large thickness adjacent the narrow overlap region 302*o* to a relatively small or substantially zero thickness at a second edge 302*t* opposite the bottom (longest) edge 302*b*. By using a tapered foam 304, a compressible foam is compressed less during installation, particularly at the top edge 302*t* of the substrate 302. In some types of foam, this may reduce or prevent compaction of the beads that could result in reduction of the interstices between foam beads. Thus, the tapered foam may allow for freer drainage than a foam of uniform thickness that is compressed when installed. Also, the use of a contoured foam 304 preferably allows the space between the exterior sheathing 310 and the substrate 302 to be filled with foam. The foam can be bonded using an adhesive 306, which may be the same as adhesive 106 described above. In alternative embodiments, the foam 304 is bonded without adhesive.

Figure 4A:
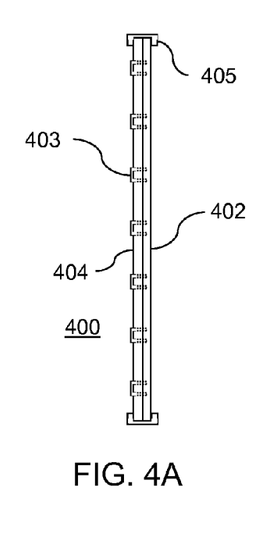
FIG. 4A is a left side elevation view of an exemplary embodiment of a foam backed fiber cement panel.
Figure 4B:
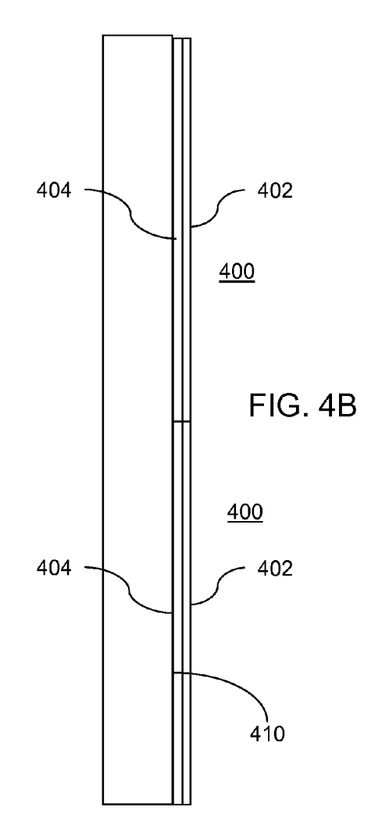
FIG. 4B is a left side elevation view showing two panels as shown in FIG. 4A, installed on an exterior surface of a building.

FIGS. 4A and 4B show another embodiment of a soffit or panel 400, comprising a fiber cement substrate 402 and foam 404 covering an entire rear major surface of the soffit or panel. The substrate 402 may have any of a variety of surface patterns and textures, such as stucco, for example. FIG. 4A shows a panel 400. FIG. 4B shows two panels 400 installed on the exterior sheathing or surface 410 of a building. In the case of a panel 400, there is no overlap between adjacent panels. Instead, the panels 400 abut each other. Therefore, by covering the entire rear face of the substrate 402 with foam 404, a continuous insulation and drainage path is provided behind the substrate 402.

The embodiment of FIGS. 4A and 4B includes foam 404 joined to the substrate 402 without the use of adhesives. In one embodiment, to bond the foam to the substrate, the foam 404 can be poured directly onto the rear surface of the substrate 402, and then the foam is allowed to solidify. Preferably, the foam is poured on in the form of bubbles or beads of approximately the same size or diameter, so that interstices are formed between the cells of the foam to allow drainage. Polypropylene and polyethylene are both thermoplastic, and would be suitable foam materials for this purpose. It is contemplated that some thermosets, such as polyurethane or epoxy, may also be suitable foam materials for this purpose.

As an alternative to pouring the foam 404 onto the substrate 402 and solidifying the foam, a sheet of foam can be fused to the major surface of the substrate by application of heat and pressure. For example, the heat can be applied to the surface of the foam that is to face the substrate, or the heat can be applied to the substrate, prior to interfacing the foam sheet to the bonding surface of the substrate.

Alternatively, the foam 404 can be mechanically fastened to the substrate 402 (e.g., using staples, flanges or prongs). For example, FIG. 4A shows a plurality of staples 403 and prongs 405 attaching the foam 404 to the substrate.

Although examples are provided above in which the substrate is shaped as a section of siding, a shake, a soffit, a roofing tile or shingle, or a panel, other substrate shapes may be used. For example, various configurations of foam backed trim pieces having differing aspect ratios may be formed using the materials and methods described above. Such trim pieces may be used for example, at corners and along edges of the foam backed siding of FIGS. 1C-1D, or the panels of FIGS. 4A, 4B, 5A and 5B.

A method for forming the siding, shake(s), soffit or panel includes providing a fiber cement substrate 102, 202, 302 or 402. A slurry is formed containing cement, silica and cellulosic fiber, such as wood or recycled paper fiber, and other optional additives. Sheets are formed from the slurry by any of a number of processes such as, for example, the Hatschek sheet process, the Mazza pipe process, the Magnani sheet process, injection molding, extrusion, hand lay-up, molding, casting, filter pressing, flow on machine, roll forming, or the like, with or without post-formation pressing. Preferably, a plurality of the individual layers formed from the slurry are joined together and then cured by autoclaving in a steam pressurized vessel, for example at 120 to 200° C. for 3 to 96 hours. The length of time and temperature chosen for curing is dependent on the composition of the slurry, the manufacturing process and the form of the substrate.

A porous, closed cell foam 104, 204, 304, 404 is bonded to a substantial portion of a major surface of the fiber cement substrate 102, 202, 302, 402. The foam 104, 204, 304, 404 may be bonded to a region that occupies from about one half the substrate area to all or nearly all of the substrate area. The fraction of the substrate area to which the foam is bonded depends on the type of product (siding, shingles, shakes, soffit or panel).

For example, if the substrate is shaped as a section of siding or a shake, then the bonding step preferably includes covering a rear surface of the siding or shake with the foam, except in a region where the section of siding or shake is to overlap a neighboring section of siding or shake. If the substrate is shaped as a section, panel, shake or shingle of siding or roofing, then the bonding step preferably includes covering a rear major surface of the fiber cement substrate with the foam, except in a relatively narrow region adjacent to a longest edge of the substrate. If the substrate is a soffit or a panel, then the bonding step preferably includes covering an entire rear major surface of the soffit or panel.

In some embodiments, such as described above with reference to FIGS. 1A-1D, 2A-2B, and 3A-3B, the bonding step comprises: providing the foam in the form of a sheet, and bonding the foam to the substrate with an adhesive. Optionally the panels shown in FIGS. 4A, 4B, 5A and 5B could be bonded using an adhesive (not shown).

In other embodiments, such as the panel shown in FIGS. 4A and 4B, the foam 404 is directly bonded to the substrate 402 without an adhesive therebetween. In one embodiment, the foam can be formed in place directly on the substrate 402. The foam can also be directly bonded to other types of substrates (e.g., siding), so long as the overlap area (to which the foam is not to be bonded) is masked to prevent the foam from covering that region.

Figure 5A:
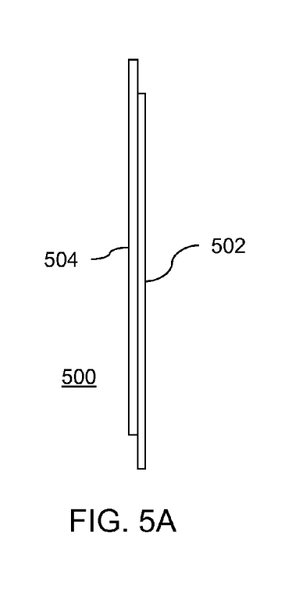
FIG. 5A is a left side elevation view of a variation of a foam backed fiber cement panel.
Figure 5B:
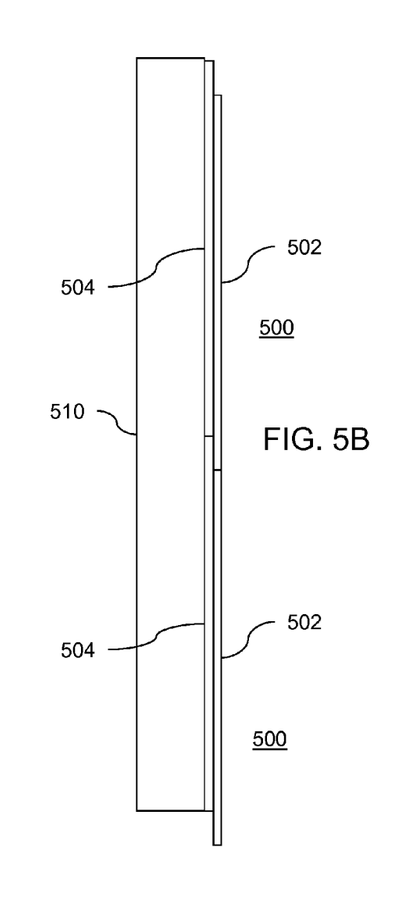
FIG. 5B is a left side elevation view showing two panels as shown in FIG. 5A, installed on an exterior surface of a building.

FIGS. 5A and 5B show another variation of the panel shown in FIGS. 4A and 4B comprising a fiber cement substrate 502 and foam 504 covering substantially an entire rear major surface of the soffit or panel (except for an overlap area with an adjacent panel). The substrate 502 may have any of a variety of surface patterns and textures, such as stucco, for example. FIG. 5A shows a panel 500. FIG. 4B shows two panels 500 installed on the exterior sheathing or surface 510 of a building. In FIGS. 5A and 5B, the foam 504 is vertically offset from the substrate 502, to provide overlap on both upper and lower edges of a siding piece 500 that would have a butt-joint face appearance. In this configuration, none of the exterior sheathing or surface 510 is exposed at the joint between adjacent panels 500. Also the path length for entry of moisture is increased, thereby modulating and preferably reducing the potential for moisture intrusion.

Figure 6A:
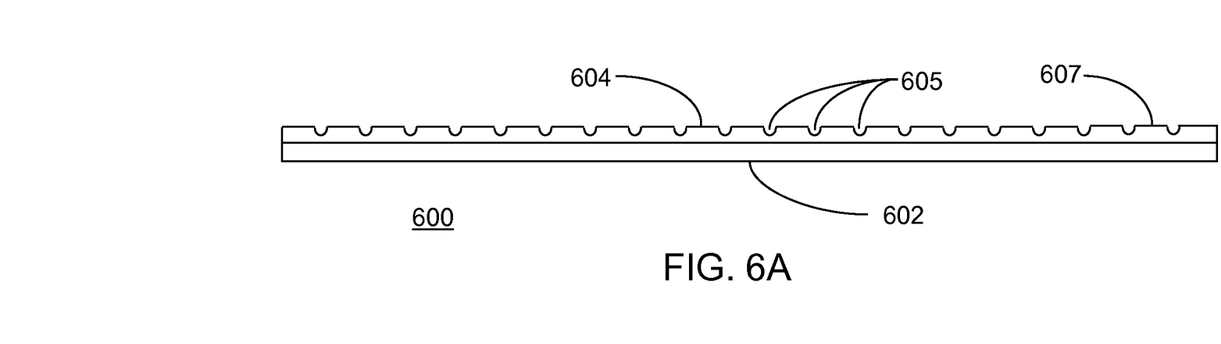
FIG. 6A is a plan view of another variation of a foam backed fiber cement substrate.
Figure 6B:
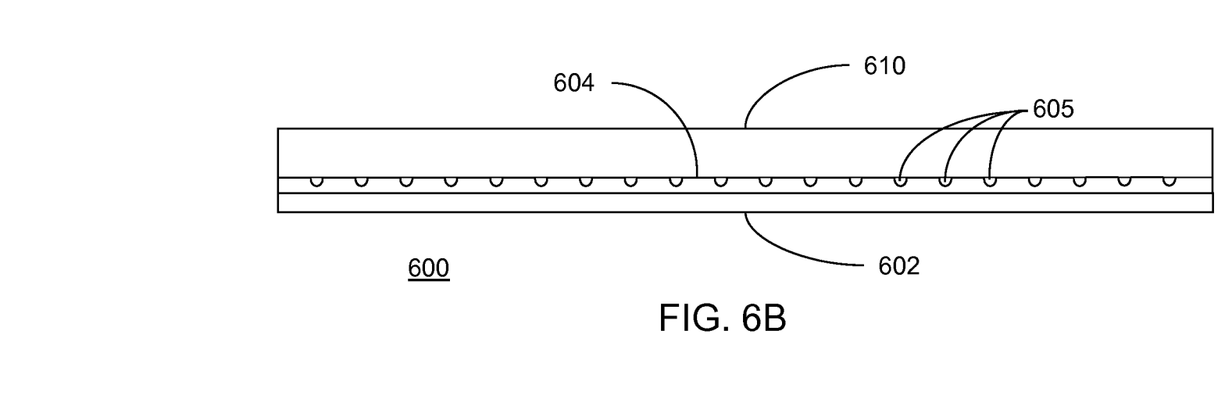
FIG. 6B is a plan view showing a foam backed fiber cement substrate as shown in FIG. 6A, installed on an exterior surface of a building.

FIGS. 6A and 6B show another embodiment of a product 600 comprising a fiber cement substrate 602 having foam 604 bonded thereto. The substrate 602 can be any of the substrate types described above (section of siding, a shake, a soffit, a roofing tile or shingle, or a panel). The foam 604 can be any of the foam materials described above, and can be joined or bonded to the substrate 602 by any of the methods described herein. The foam layer 604 differs from the foam layers 104, 204, 304, 404 or 504 in that foam layer 604 has a plurality of grooves or channels 605 on at least one major surface thereof. The foam 604 is a closed-cell foam, to prevent sponge-like absorption of water. Because of the presence of the grooves 605, foam 604 may optionally be porous or non-porous.

Figure 6C:
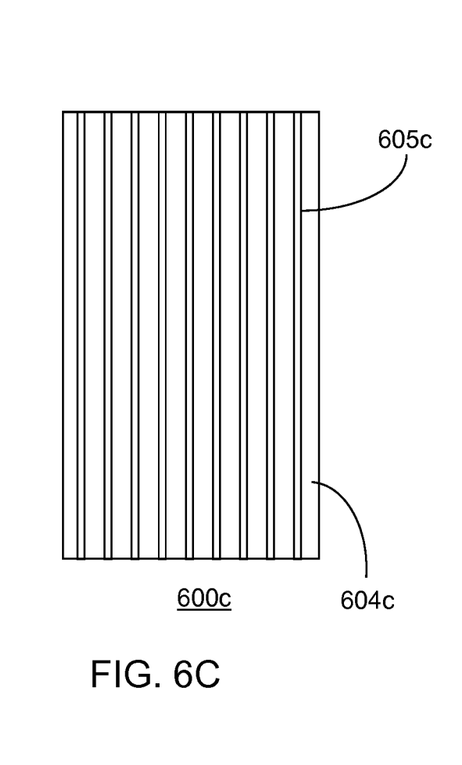
FIG. 6C is a rear elevation view of a panel having vertical grooves, for mounting in a portrait position.
Figure 6D:
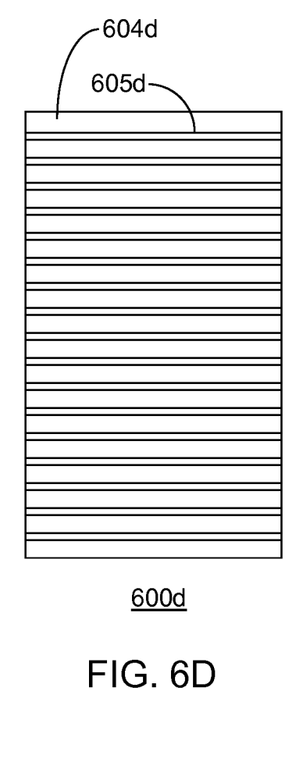
FIG. 6D is a rear elevation view of a panel with horizontal grooves, for mounting in a landscape position.

The grooves 605 in the back of the foam 604 enhance water drainage. Thus, the grooves 605 should be oriented in a direction with a substantial vertical component in the expected installed orientation of the product 600 on a building exterior 610 (FIG. 6B). In the case of panels, which may be installed in either "portrait" or "landscape" orientation, the product 600 may be fabricated in two different versions: a portrait version (FIG. 6C) with the grooves 605c in the foam 604c parallel to the long sides of the panel 600c, and a landscape version (FIG. 6D) with the grooves 605d in the foam 604d parallel to the short sides of the panel 600d.

Figure 6E:
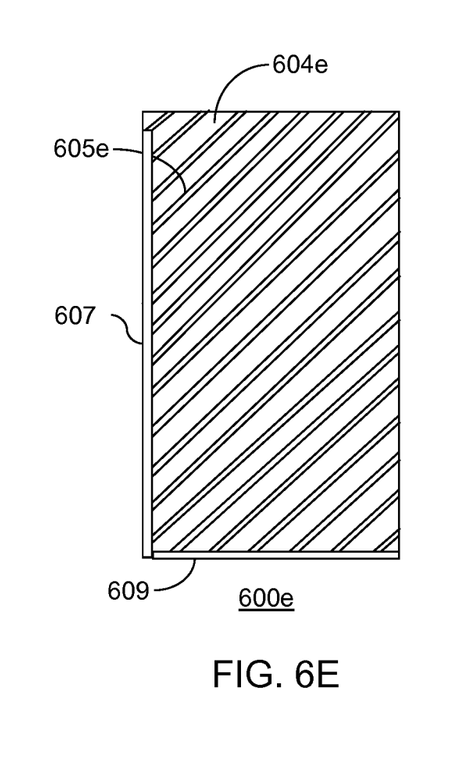
FIG. 6E is a rear elevation view of a panel with diagonal grooves, for mounting in either portrait or landscape position.

Alternatively, as shown by panel 600e in FIG. 6E, grooves 605e in foam 604e may be oriented in a diagonal or other off-vertical direction to accommodate variable direction installation while enabling gravity assisted drainage. Although the direction vector of the grooves has a vertical component, the grooves 605e are oriented in a direction that is not parallel or perpendicular to side edges of the panel 605e. In one embodiment, a pair of grooves 607 and 609 are placed along two sides of the panel 600e, to modulate drainage of water from sides of the panel. For example, if the panel is mounted in portrait format, groove 607 drains water from the upper grooves 605 having their bottoms along the side of the panel. If the panel is mounted in landscape format (with groove 609 on the right), groove 609 drains water from the upper grooves 605 having their bottoms along the side of the panel.

The grooves or channels 605 in the foam could be any width and depth. The spacing between the grooves 605 may be any distance, and may be varied within a single section of siding, a shake, a soffit, a roofing tile or shingle, or a panel 600. The ratio between the portion of the foam covered by grooves 605 and the non-grooved portions 607 (which may be otherwise flat, e.g., curved or textured surfaces) of the foam between the grooves may be varied. And the portions between grooves are not required to be straight, but can be wavy, for example. Although the illustrated grooves 605 have a substantially semi-circular cross section, other groove or channel cross-sectional shapes may used, such as, for example, semi-elliptical, rectangular or V-shaped grooves.

Preferably, the grooves or channels 605 face away from the substrate 602, so that the entire major surface of the foam 604 facing the substrate 602 can be bonded to the substrate. This allows a simpler bonding operation, and better bonding. In other embodiments (not shown), the grooves or channels face the substrate. In still other embodiments (not shown), the grooves may be provided on both major surfaces of the foam. Respective pairs of grooves on both major faces may be directly opposite each other, or they may be interleaved, or mixed in relative configuration.

A method of using an exemplary product comprises: providing a unitary panel, section of siding or shake, the panel, section of siding or shake including a fiber cement substrate and a porous, closed cell foam bonded to a substantial portion of a major surface of the fiber cement substrate, and mounting the panel, section of siding or shake on a building surface. The exemplary products can be fastened to the building by a variety of fasteners, including, but not limited to, nails, staples, screws, and the like or, alternatively adhesive means such as, for example, glues or tapes.

In some embodiments (as described above with reference to FIGS. 3A and 3B), the foam is tapered from a relatively large thickness adjacent the narrow region not covered by the foam to a relatively small or substantially zero thickness at a second edge of the substrate. The second edge of the substrate is one of the two longest edges, and is opposite the edge that is adjacent the narrow uncovered region. When the foam is thus tapered, the method of using the product further comprises: overlapping a second section of siding or shake with the first section of siding or shake, so that a rear surface of the foam on each of the first and second sections of siding or shakes contacts the building surface.

If the foam covers a rear surface of the siding or shake, except in a region where the section of siding or shake is to overlap a neighboring section of siding or shake (e.g., as shown in FIG. 2C), the mounting step includes positioning the section of siding or shake so that a rear major surface of the foam contacts the building surface and acts as a spacer to position the region of the section of siding or shake at a non-zero distance from the building surface.

If the foam faces the front (as shown in FIG. 2D), the mounting step includes using the foam as a spacer. The top edge of the foam may possibly also be used as an indictor for positioning of a subsequently applied panel. That is, a second panel 200 would be mounted with the top of the slots 202s below the top edge of the immediately preceding panel (the adjacent panel immediately below). This way, the top edge of the adjacent panel immediately below is not visible through the slots 202s.

If the foam covers a rear surface of the siding or shake, except in a region where the section of siding or shake is to overlap a neighboring section of siding or shake (FIG. 2C), then the mounting step includes positioning the section of siding or shake so that a bottom edge of the foam rests on a top edge of an adjacent section of siding or shake. If foam is on the front (FIG. 2D), the bottom edge of the foam is at or above the bottom edge of an overlaid adjacent section of siding above the panel (preferably the upper edge of the foam is at or above the top of the slots of the overlaid adjacent panel. Then the foam is continuously visible along the length of the slots from top to bottom, and the top edge of the foam is hidden.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of mounting a first panel section and a second panel section of siding, shingle or shake to a building surface, wherein the method comprises:
providing or obtaining the first panel section and the second panel section of siding, shingle or shake, wherein each of the first and second panel sections comprises:
(i) a plurality of substrates each containing fibers in a cement matrix and including a major surface, and
(ii) a single porous, closed cell foam covering and bonding to a portion of the major surface of the plurality of substrates to provide a covered region, the plurality of substrates being separated apart along the foam by slots, the foam being uncovered and exposed at the slots, the covered region of each substrate comprising a top edge and a bottom edge, and an overlap region of said substrates, the overlap region being uncovered by said foam, said foam having closed cell polymer beads, wherein the beads are fused to one another at their tangent points and provide interstices between the beads, wherein the porous, closed cell foam is uniformly tapered from a thickness at the bottom edge to a smaller thickness at the top edge;
mounting each of said first and second panel sections to the building surface with said foam being disposed behind said substrates, which provides moisture drainage behind said substrates by way of the interstices between the beads; and wherein the second panel section is mounted such that said overlap region of the first panel section overlies the covered region of the second panel and the top edge of the covered region of the second panel abuts the bottom edge of the first panel at an interface orthogonal to the substrates.

2. The method of claim 1, comprising:
mounting each panel section to the building surface so that a rear surface of the foam contacts the building surface.

3. The method of claim 1, wherein said step of mounting each panel section includes: positioning the section of siding, shingle or shake so that a major surface of the foam contacts the building surface and acts as a spacer to position the region of the panel section of siding, shingle or shake at a non-zero distance from the building surface.

4. The method of claim 1, wherein for each panel section, the foam covers a rear surface of the siding, shingle or shake, except in said overlap region where the panel section of siding, shingle or shake is to overlap a neighboring section of siding, shingle or shake, and said step of mounting each panel section includes positioning the section panel of siding, shingle or shake so that a bottom edge of the foam rests on a top edge of an adjacent section of siding, shingle or shake.

5. The method of claim 1, wherein the foam is made of polypropylene or polyethylene.

6. The method of claim 1, wherein the foam is in the form of a sheet and an adhesive bonds the foam to each substrate.

7. The method of claim 1, wherein the foam is bonded to each substrate without an adhesive there between.

8. The method of claim 7, wherein the foam is attached to each substrate using staples, flanges or prongs.

9. The method of claim 7, wherein the foam is attached to each substrate by fusion or forming the foam on the substrate, or pouring the foam onto the substrate, and allowing the foam to solidify.

10. The method of claim 1, wherein each panel section comprises:
a plurality of grooves in a surface of the closed cell foam.

11. The method of claim 10, wherein each substrate is shaped as a section of siding, a shake, a soffit, roofing tile or shingle, a panel, or a trim piece.

12. The method of claim 10 wherein the grooves are oriented so that they have a direction with a vertical component when the siding, shake, soffit, roofing tile or shingle, panel, or trim piece is installed.

13. The method of claim 12, wherein the grooves are located on the major surface of the foam facing away from the substrates.

14. The method of claim 12, wherein the grooves are oriented in a direction that is not parallel or perpendicular to side edges of the substrate, the foam further comprises a first additional groove located along a vertical side edge of the substrate, the first additional groove connected to the plurality of grooves.

15. The method of claim 14, the foam further comprises a second additional groove located along a horizontal side edge of the substrate, the second additional groove connected to the plurality of grooves.

16. The method of claim 12, wherein the foam comprises polyurethane.

17. The method of claim 1, wherein said foam being disposed behind said substrate has an edge adapted to engage an edge on another substrate of an adjacent panel section on the building surface.

18. The method of claim 1, wherein an air space is formed between the building surface and the bottom edge of the foam of the first panel section.

19. A method of mounting a first panel section and a second panel section of siding, shingle or shake for mounting to a building surface, wherein the method comprises:
providing or obtaining the first panel section and the second panel section of siding, shingle or shake, wherein each of the first and second panel sections comprises:
(i) a plurality of substrates each containing fibers in a cement matrix and including a major surface, and
(ii) a single porous, closed cell foam covering and bonding to a portion of the major surface of the substrates to form a covered region, the plurality of substrates being separated apart along the foam by slots, the foam being uncovered and exposed at the slots, the covered region comprising a top edge and a bottom edge, and an overlap region of said substrates, the overlap region being uncovered by said foam, said foam having closed cell polymer beads, wherein the beads are fused to one another at their tangent points and provide interstices between the beads;
mounting each of said first and second panel sections to the building surface with said foam being disposed in front of said substrates, which provides moisture drainage in front of said substrates by way of the interstices between the beads, such that the substrates are positioned directly against the building surface and the foam faces away from the building surface; and
wherein the second panel section is mounted such that said overlap region of the first panel section overlies the covered region of the second panel and the top edge of the covered region of the second panel abuts the bottom edge of the first panel at an interface orthogonal to the substrates.

20. The method of claim 19, wherein said step of mounting each panel section includes:
positioning the section panel of siding, shingle or shake so that a major surface of the foam faces away from the building surface and acts as a spacer to position a bottom portion of an adjacent panel section of siding, shingle or shake at a non-zero distance from the building surface.

21. The method of claim 20, wherein the substrate is positioned between the building and the foam, so that the foam does not contact the building.

22. The method of claim 21, further comprising mounting a starter piece to the building to orient the first panel section that is a bottom panel section in a plurality of panel sections attached to the building.

* * * * *